United States Patent
Wang et al.

(10) Patent No.: US 10,860,863 B2
(45) Date of Patent: Dec. 8, 2020

(54) VISION BASED TARGET TRACKING USING TRACKLETS

(71) Applicant: VMAXX, Inc., Menlo Park, CA (US)

(72) Inventors: Jinjun Wang, San Jose, CA (US); Rui Shi, Xi'an (CN); Shun Zhang, Xi'an (CN)

(73) Assignee: DEEPNORTH INC., Foster City, CA (US)

( * ) Notice: Subject to any disclaimer, the term of this patent is extended or adjusted under 35 U.S.C. 154(b) by 28 days.

(21) Appl. No.: 15/792,557

(22) Filed: Oct. 24, 2017

(65) Prior Publication Data

US 2018/0114072 A1 Apr. 26, 2018

Related U.S. Application Data

(60) Provisional application No. 62/412,652, filed on Oct. 25, 2016, provisional application No. 62/412,689, filed on Oct. 25, 2016.

(51) Int. Cl.
*G06K 9/00* (2006.01)
*G06T 7/277* (2017.01)
(Continued)

(52) U.S. Cl.
CPC ....... *G06K 9/00771* (2013.01); *G06K 9/3241* (2013.01); *G06K 9/6297* (2013.01); *G06T 7/215* (2017.01); *G06T 7/277* (2017.01); *H04N 7/181* (2013.01); *H04N 7/183* (2013.01); *B25J 9/1697* (2013.01); *G06T 2207/20084* (2013.01); *G06T 2207/30232* (2013.01); *G06T 2207/30241* (2013.01)

(58) Field of Classification Search
CPC ............. G06T 7/215; G06T 7/277; G06T 2207/20084; G06T 2207/30241; G06T 2207/30232; G06K 9/00771; G06K 9/3241; H04N 7/183; H04N 7/181; B25J 9/1697
See application file for complete search history.

(56) References Cited

U.S. PATENT DOCUMENTS

| 2006/0115145 A1 | 6/2006 | Bishop et al. |
| 2008/0123900 A1 | 5/2008 | Ma et al. |

(Continued)

FOREIGN PATENT DOCUMENTS

| EP | 1927947 A1 | 4/2008 |
| EP | 1927947 A1 | 6/2008 |

OTHER PUBLICATIONS

Zhang et al., Multi-target tracking by learning local-to-global trajectory models, Sep. 2014.

*Primary Examiner* — Brenda C Bernardi
(74) *Attorney, Agent, or Firm* — David R. Stevens; Stevens Law Group (57) ABSTRACT

A non-hierarchical and iteratively updated tracking system includes a first module for creating an initial trajectory model for multiple targets from a set of received image detections. A second module is connected to the first module to provide identification of multiple targets using a target model, and a third module is connected to the second module to solve a joint object function and maximal condition probability for the target module. A tracklet module can update the first module trajectory module, and after convergence, output a trajectory model for multiple targets.

20 Claims, 4 Drawing Sheets

(51) Int. Cl.
  *H04N 7/18*   (2006.01)
  *G06K 9/62*   (2006.01)
  *G06T 7/215*  (2017.01)
  *G06K 9/32*   (2006.01)
  *B25J 9/16*   (2006.01)

(56) References Cited

U.S. PATENT DOCUMENTS

| | | |
|---|---|---|
| 2011/0085702 A1 | 4/2011 | Nevatia |
| 2012/0093359 A1 | 4/2012 | Kurien et al. |
| 2015/0066448 A1 | 3/2015 | Liu et al. |
| 2016/0004909 A1 | 1/2016 | Mei et al. |
| 2016/0019700 A1 | 1/2016 | Maggio et al. |
| 2016/0132728 A1 | 5/2016 | Choi |
| 2016/0161606 A1* | 6/2016 | Turner .................. G01S 13/726 702/150 |
| 2017/0154212 A1* | 6/2017 | Feris .................. G06K 9/00369 |
| 2018/0025500 A1* | 1/2018 | Nielsen .................... G06T 7/74 382/103 |

* cited by examiner

VISION BASED TARGET TRACKING USING TRACKLETS

RELATED APPLICATIONS

This application claims the benefit of U.S. Provisional Application Ser. No. 62/412,652, filed Oct. 25, 2016, which is hereby incorporated herein by reference in its entirety for all purposes. This application also claims the benefit of U.S. Provisional Application Ser. No. 62/412,689, filed Oct. 25, 2016, which is hereby incorporated herein by reference in its entirety for all purposes.

TECHNICAL FIELD

The present disclosure relates generally to a deep learning system capable of tracking objects seen in video surveillance systems. Single and multiple targets can be tracked by linking tracklets into object trajectories.

BACKGROUND

Tracking multiple visual targets from security cameras is a challenging problem. Targets must be identified, trajectories determined, and target identity maintained over time. This can be difficult in complex scene due to the existence of occlusions, clutter, changes in illumination and appearance, and target interactions. As compared to tracking single objects, tracking multiple objects is much more complex. If only a single object is to be tracked, the state of only one target needs modelling, with detections from other targets eliminated as false alarms.

Previously object identification and association between frames was accomplished locally, i.e. using local information from a few neighboring frames or frame by frame. Image information cues such as appearance, motion, size and location can be used to measure the similarity between detections from two consecutive frames. However, given only the image information in a small-time window, local association methods do not deal gracefully with long-term occlusion due to the ambiguous and noisy observations, resulting in tracking failures (e.g., trajectory fragmentation and identity switches).

In contrast to the local tracking methods, global inference techniques that evaluate over all trajectories simultaneously for a longer period can be used. However, by increasing the number of frame numbers, the hypothesis search space of those alternatives grows exponentially, making global association algorithms unsuitable for real-time processing.

Object tracking can be based on point tracking, where detected objects are represented by points that are incorporate position and motion information from previous states. Alternatively, appearance (or kernel) tracking involves tracking coherence of shape or color in multiple frames, and silhouette tracking is performed by estimating an object region in each frame. Identified objects across frames can be associated, for example, by nearest neighbor analysis, affinity measures, or particle filtering which are a grouped into short tracks (i.e. tracklets or track fragments).

Tracking embodiments based on tracklets can use, for example, a pre-trained object detector that can be applied to perform target object detections in every single frame. Then, those easy-to-connect detections in neighboring frames are linked into tracklets, and finally longer trajectories are formed by associating these tracklets globally. This data association process can be based on determining a similarity function between object detections and tracklets.

To improve computing efficiency in tracklet-based data association processes, hierarchical frameworks that split the data association into two optimization problems can be used. First tracked objects are detected and linked into tracklets by using local information, such as the Markov Random Field (MRF) model and the successive shortest path algorithm. Secondly, these linked these tracklets can be associated into longer trajectories by using global information, based, for example, on global association approaches such as network flow and the Hungarian algorithm. This allows consideration of both the local information needed to deal with noisy observation and the global information that can be used when the object target is occluded.

Learning information necessary for tracklet-based data association from an arbitrary scene can be based on offline-learning, where the process of learning is carried out before tracking, with an annotated ground truth used as a training set to learn object similarity functions. Unfortunately, in many practical applications, the ground truth is not always available.

SUMMARY

In one described embodiment, a non-hierarchical and iteratively updated tracking system includes a first module for creating an initial trajectory model for multiple targets from a set of received image detections. A second module is connected to the first module to provide identification of multiple targets using a target model. A third module is connected to the second module to solve a joint object function and maximal condition probability for the target module. Results from the third module are directed to a tracklet module that updates the first module trajectory module, and after convergence, outputs a trajectory model for multiple targets.

In selected embodiments, the first module includes sliding windows initializable from at least one of a first frame and a previous sliding window. The second module provides identification of multiple targets using a Markov random field model, while the third module finds an optimal target using a loopy belief propagation algorithm.

In another embodiment, an iteratively updated tracking system can include a first module for creating an initial trajectory model for multiple targets from a set of received image detections. A second module is connected to the first module and includes a Markov random field model to provide identification of multiple targets. A third module is connected to the second module and includes a loopy belief propagation algorithm to solve a joint object function and maximal condition probability of the Markov random field model. A tracklet module is connected to the third module. The tracklet module updates the first module trajectory module, and after convergence, outputs a trajectory model for multiple targets.

In some embodiments the first module includes sliding windows initializable from at least one of a first frame and a previous sliding window. The second module can find an optimal target assignment that maximizes the conditional probability of Markov random field modelled targets based on the image detections, and the third module can find an optimal target assignment that maximizes the conditional probability of Markov random field modelled targets defined as:

$$P(L \mid Y; \Gamma) = \frac{1}{Z_p} \prod_i \Phi(l_i, Y_i; \Gamma) \prod_{(ij)} \Psi(l_i, l_j, Y_i, Y_j; \Gamma)$$

In one method embodiment, a non-hierarchical and iteratively updated tracking method includes the steps of creating an initial trajectory model for multiple targets from a set of received image detections. Using information from the initial trajectory model multiple targets can be identified using a target model. A joint object function and maximal condition probability is solved for the target model; the trajectory model is updated and the method repeated until solution convergence. After convergence, a trajectory model for multiple targets can be outputted.

In another embodiment, a non-hierarchical and iteratively updated tracking system can include a sample collection module that takes tracklets and generates samples. An online metric learning module can use the generated samples to form an initial appearance module metric with a regularized pairwise constrained component analysis (PCCA) algorithm. A tracklet association module receives appearance model metric data and can both update the sample collection module and link tracklets into a final trajectory.

In some embodiments, the sample collection module includes sliding windows to generate initial samples. In other embodiments, the sample collection module receives tracklets formed by a pairwise Markov random field model. The sample collection module can constrain tracklets by requiring each target object have one tracklet, or alternatively or in addition, constrain tracklets by requiring each target object to have velocity changes less than a predetermined average velocity.

In other embodiments the iteratively updated tracking system can include an online metric module that learns a projection matrix based on logistic loss function. In some embodiments, the online metric module learns a projection matrix based on an objective function:

$$\min_P E(P) = \sum_{k=1}^{N'} \ell_\beta(y_k(D_P^2(x_m^k, x_n^k) - 1)) + \lambda\|P\|^2$$

In other embodiments the iteratively updated tracking system can include the tracklet association module that uses appearance and velocity descriptors to link tracklets. The tracklet association module can calculate an affinity score using an objective function such as:

$$S_{ij}(F_i, F_j) = C_a(F_i, F_j) C_v(F_i, F_j)$$

In a method embodiment, a non-hierarchical and iteratively updated tracking method can include the steps of receiving tracklets and generating samples using a sample collection module. Samples can be generated with an online metric learning module that uses the generated samples to form an initial appearance module metric with a regularized pairwise constrained component analysis (PCCA) algorithm. After receiving appearance model metric data and updating the sample collection module the multiple tracklets can be respectively linked into a final trajectory map.

In some embodiments of the non-hierarchical and iteratively updated tracking method the sample collection module can include sliding windows to generate initial samples. The sample collection module can receive tracklets formed by a pairwise Markov random field model. In other embodiments, the sample collection module constrains tracklets by requiring each target object have one tracklet, or alternatively or in addition constrains tracklets by requiring each target object to have velocity changes less than a predetermined average velocity.

DETAILED DESCRIPTION

Figure 1:
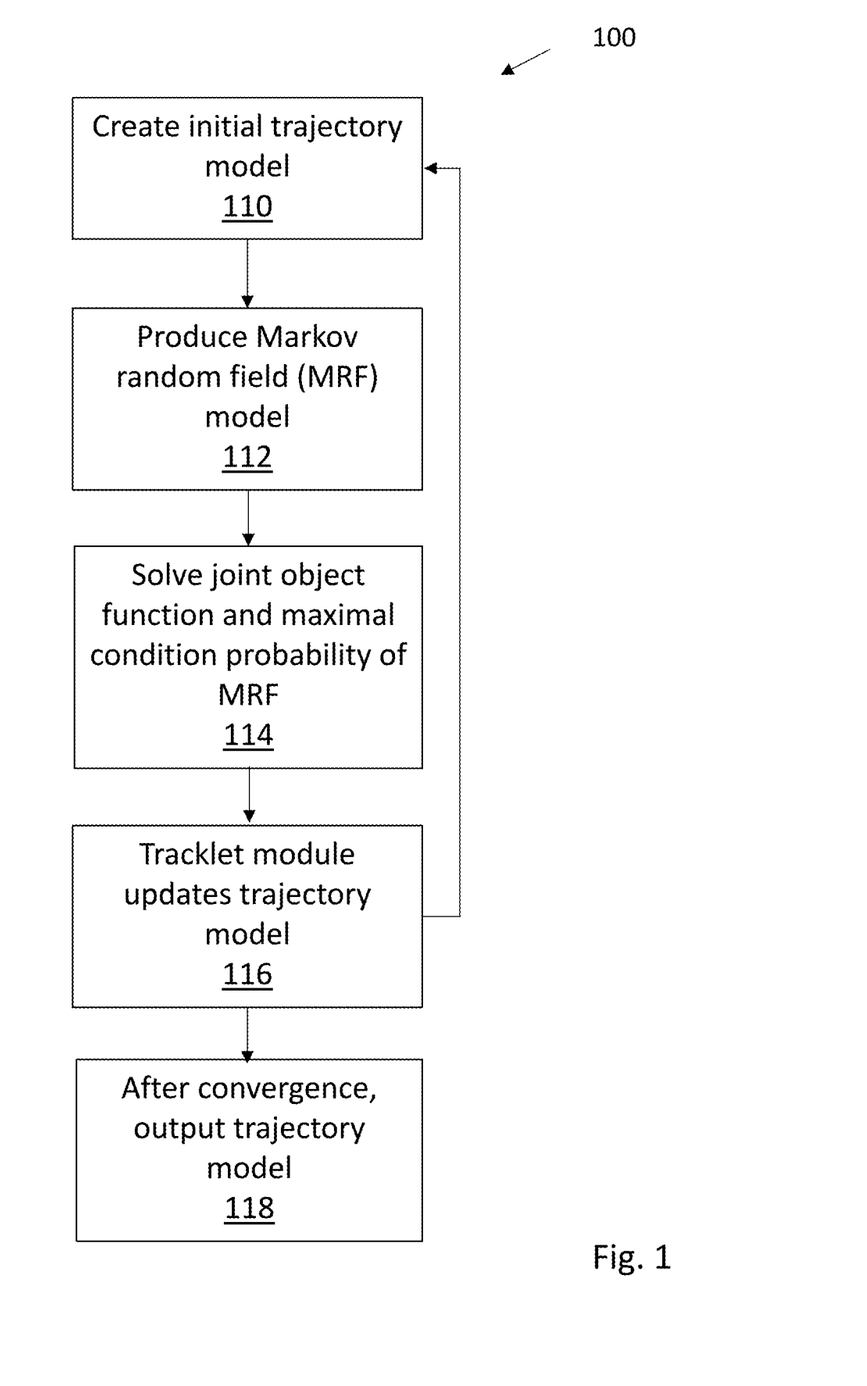
FIG. 1 is a system and method for providing trajectory data based on multiple tracklets.

FIG. 1 is a cartoon illustrating a system and method 100 for creating a trajectory model based on a first module 110 able to create an initial trajectory model for multiple targets created from a set of received image detections. A second module 112 is connected to the first module to produce a Markov random field model able to provide identification of multiple targets. A third module 114 is connected to the second module and includes a loopy belief propagation algorithm to solve a joint object function and maximal condition probability of the Markov random field model. A tracklet module 116 is connected to the third module 118 that is able to update the first module trajectory module. After convergence, a trajectory model 118 for multiple targets is output.

Figure 2:
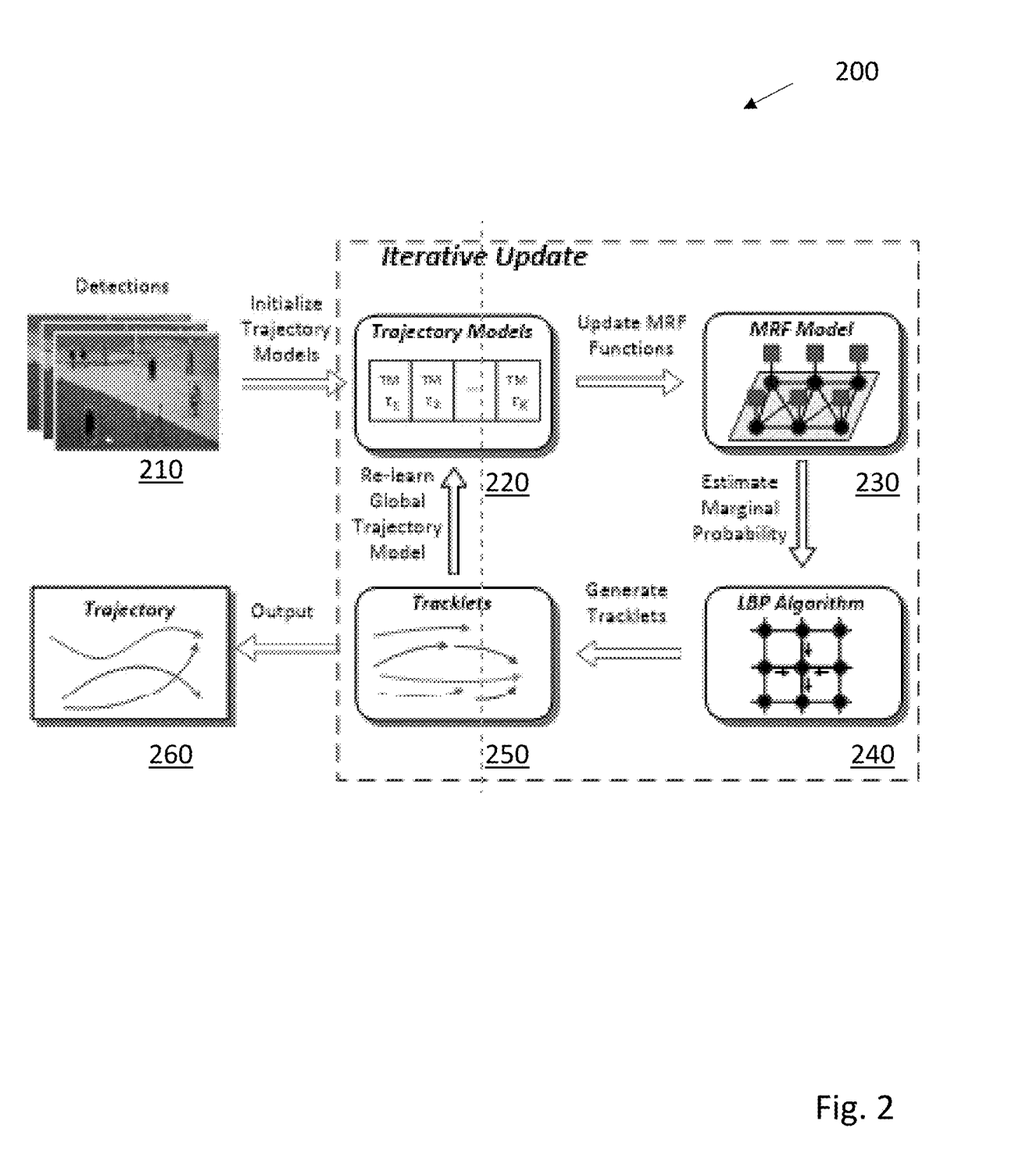
FIG. 2 illustrates a system that provides an online unified framework to determine local-to-global trajectory models as a joint optimal assignment.

In contrast to conventional hierarchical methods that heuristically formulate a data association method as two separate optimization schemes (e.g. local, then global), FIG. 2 shows a system 200 that provides an online unified framework to determine local-to-global trajectory models as a joint optimal assignment. The system 200 uses an iterative algorithm to alternately update the trajectory models and link detections or tracklets into longer fragments. As the iterative process continues, the trajectory models become accurate, and the broken tracklets are connected to form longer trajectories. Data association is treated as inferences of target IDs for all the detections using pairwise Markov Random Field (MRF). In one embodiment, a loopy belief propagation (LBP) algorithm is used to optimize the MRF model so as to generate separated tracklets.

As seen in FIG. 2, system 200 is multi-target tracking system and method that is able automatically link the tracklets or detections 210 into trajectories based on a local-to-global trajectory model. At the beginning of each sliding window, trajectory models 220 are initialized by the local information either/both a first frame or from the previous sliding window. A pairwise Markov Random Field model 230 infers target identification for all detections in the sliding window and can employ a loopy belief propagation algorithm 240 to solve the joint object function—maximal conditional probability of MRF model. Detections with the same label in adjacent frames are linked to form reliable tracklets 250. Finally, trajectory models 260 are updated using the reliable tracklets 250. Meanwhile, number of trajectory models can be reset to eliminate the false models caused by false alarms and add new models for newly emerging targets. The trajectory models for all targets and maximization of the conditional probability of the MRF model can be alternately continued until the result converges.

Figure 3:
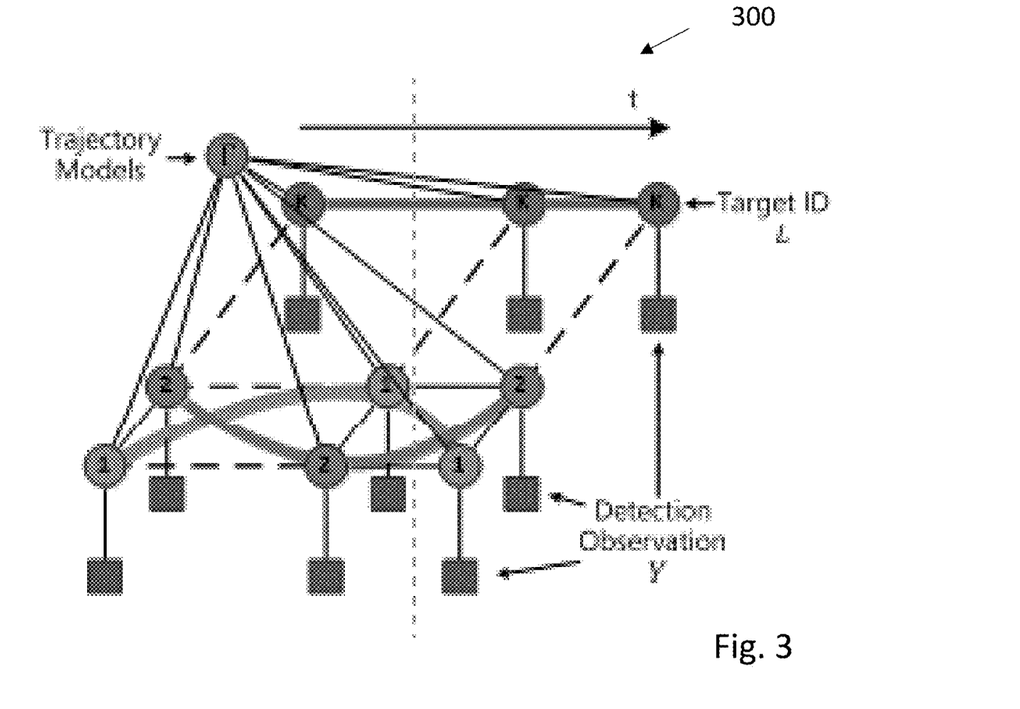
FIG. 3 illustrates use of a Markov Random Field (MRF) model.

In more detail, let Y={$y_1,y_2,\ldots,y_N$} be a set of detections and L={$l_1,l_2,\ldots,l_N$} be their labels (target IDs). The overall goal is to find the optimal assignment for the identity of targets based on the detection set. It is equivalent to maximize the conditional probability P(L|Y) of the MRF model 300 as shown in FIG. 3, where for each node i, $y_i$ and $l_i$ correspond to its observation and its state to be estimated, respectively. Assume there are K targets in the scene, then $l_i \in \{1,\ldots,K\} \cup \emptyset$, where $\emptyset$ denotes false detections. Using this model, P(L|Y) is defined as:

$$P(L|Y;\Gamma) = \frac{1}{Z_p} \prod_i \Phi(l_i, Y_i; \Gamma) \prod_{\langle ij \rangle} \Psi(l_i, l_j, Y_i, Y_j; \Gamma)$$

where $Z_p$ is the normalization factor. The unary term $\Phi(l_i, Y_i;\Gamma)$ describes how the hidden state value $l_i$ fits the observation $Y_i$. The pairwise term $\Psi(l_i,l_j,Y_i,Y_j;\Gamma)$ defines the probability that two adjacent nodes possess the same label. The neighborhood of node i in the proposed MRF model consists of all the nodes from both the previous frame $t_i-1$, the next frame $t_i+1$ and all other nodes within the same frame $t_i$.

In P(L|Y), the probability depends on a hyper-parameter set $\Gamma$. It is composed of the trajectory models for all targets, $\Gamma=\{\tau_1,\ldots\tau_K\}$. Each $\tau_k \in \Gamma$ is defined as $\tau=[\tau_k^p,\tau_k^v,\tau_k^a,\tau_k^s]$, where $\tau_k^p=\{p_k^0,T_k,O_k,\tau_k^p\}$ denotes the position parameters of target k that include the initial position $p_k^0$, the Kalman Filter parameters with the transition matrix $T_k$ and observation matrix $O_k$, and the variance $\sigma_k^p$. $\tau_k^s=\{\mu_k^s,\sigma_k^s\}$ denotes the mean and variance of its ($d^x,d^y$) velocity, $\tau_k^s=\{\mu_k^s,\sigma_k^s\}$ denotes the scalar mean and variance of its size, and represents a target-specific classifier that is trained using the previous detections, and consequently used to classify the new detections. We also represent each detection with $Y_i=[Y_i^p,Y_i^v,Y_i^a,Y_i^s]$, including its ($d^x,d^y$) position $Y_i^p$, velocity $Y_i^v$, appearance $Y_i^a$, and size $Y_i^s$.

Figure 4:
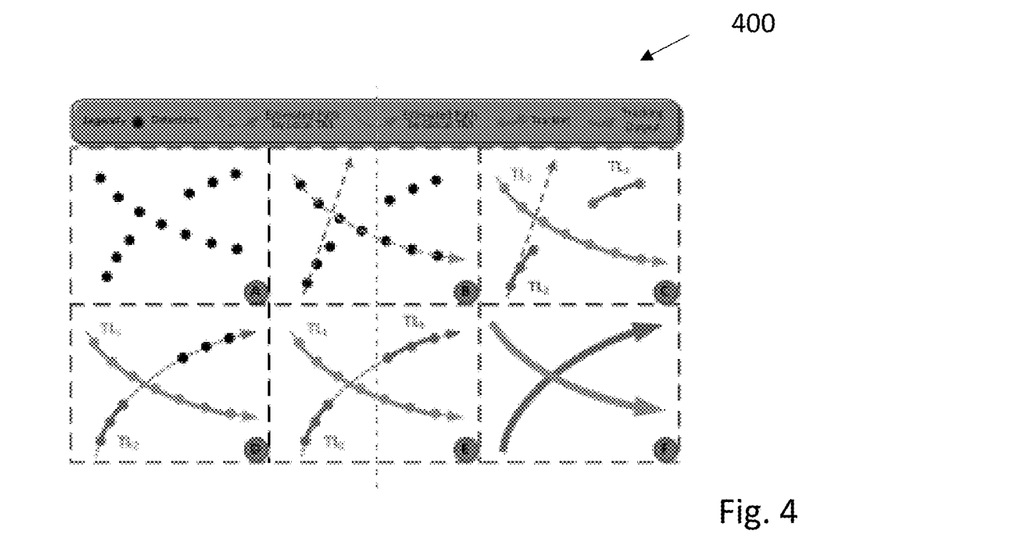
FIG. 4 illustrates an iterative algorithm that automatically learn trajectory models from the local-to-global information.

Model inference can be based on an iterative algorithm that automatically learn trajectory models from the local-to-global information, shown in cartoon form 400 in FIG. 4. In effect, the iterative algorithm alternatively optimizes the trajectory models for all targets and maximizes the conditional probability of MRF model. Specifically, local-to-global trajectory model learning includes step (A) where detections are output from the object detector; (B) the estimated path by the initial local trajectory models is determined; (C) detections are linked into tracklets by the local trajectory models; (D) the trajectory models are re-learned by the reliable tracklets TL 1 and TL 2; (E) tracklets are relinked by the global trajectory models; and (F) the final trajectory for multiple objects is provided.

In some embodiments, initialization of the trajectory models handles two tasks: (1) initializing the trajectory models $\Gamma$ at the beginning of the tracking task, i.e., in the first iteration of the first sliding window; and (2) initializing $\Gamma$ every time when sliding the analysis windows, i.e., in the first iteration of all analysis windows except the first one.

Maximization of MRF conditional probability P(L|Y;$\Gamma$) can use a MRF model whose generative and link probabilities are calculated by the established trajectory models $\Gamma$. A sum-product loopy belief propagation algorithm which computes the marginal distribution by iteratively passing messages between neighbors can be used. The BP message-update equations are iterated until they converge. In order to select confident nodes, we set a threshold for the belief $b(l_i)$ of node i, i.e., node i will be assigned label k when $b(l_i=k)>T_b$. Thus the nodes with the same label k in adjacent frames are linked to form tracklet $TL_k$, which is a relatively reliable segment of the final target trajectory.

After maximizing the MRF conditional probability by the LBP algorithm and generating a set of confident and separated tracklets, the trajectory model learning handles the following two tasks: (1) updating the number of trajectory models K to accommodate false positive detections and newly emerging targets; and (2) updating $\Gamma$ by the reliable tracklets.

Alternative tracking system embodiments are also contemplated. For example, another embodiment that uses tracklet association to form long trajectories for robust multi-target tracking in a single camera can involve improvement of learned appearance features to handle the dynamics of visual targets that exhibit a large amount of variability. Different from other online-learning methods, effective similarity metrics can be learned in an iterative. Reliable tracklets can be segmented into multiple non-overlapping sliding windows; and for each temporal window, positive and negative training samples collected to learn the metrics in an online fashion. Up-to-date metrics associate tracklets in adjacent windows to update our training samples. This allows better metrics can be re-learned through such iterative processes, and long trajectories can be formed window-by-window. In effect, providing both a framework for collecting samples online to learn the appearance model during tracking, and using an iterative process to obtain more training samples that are less sensitive to the variation of targets' visual appearance, allows better handling of inter-object occlusions and interactions, while improving overall tracking ability.

Figure 5:
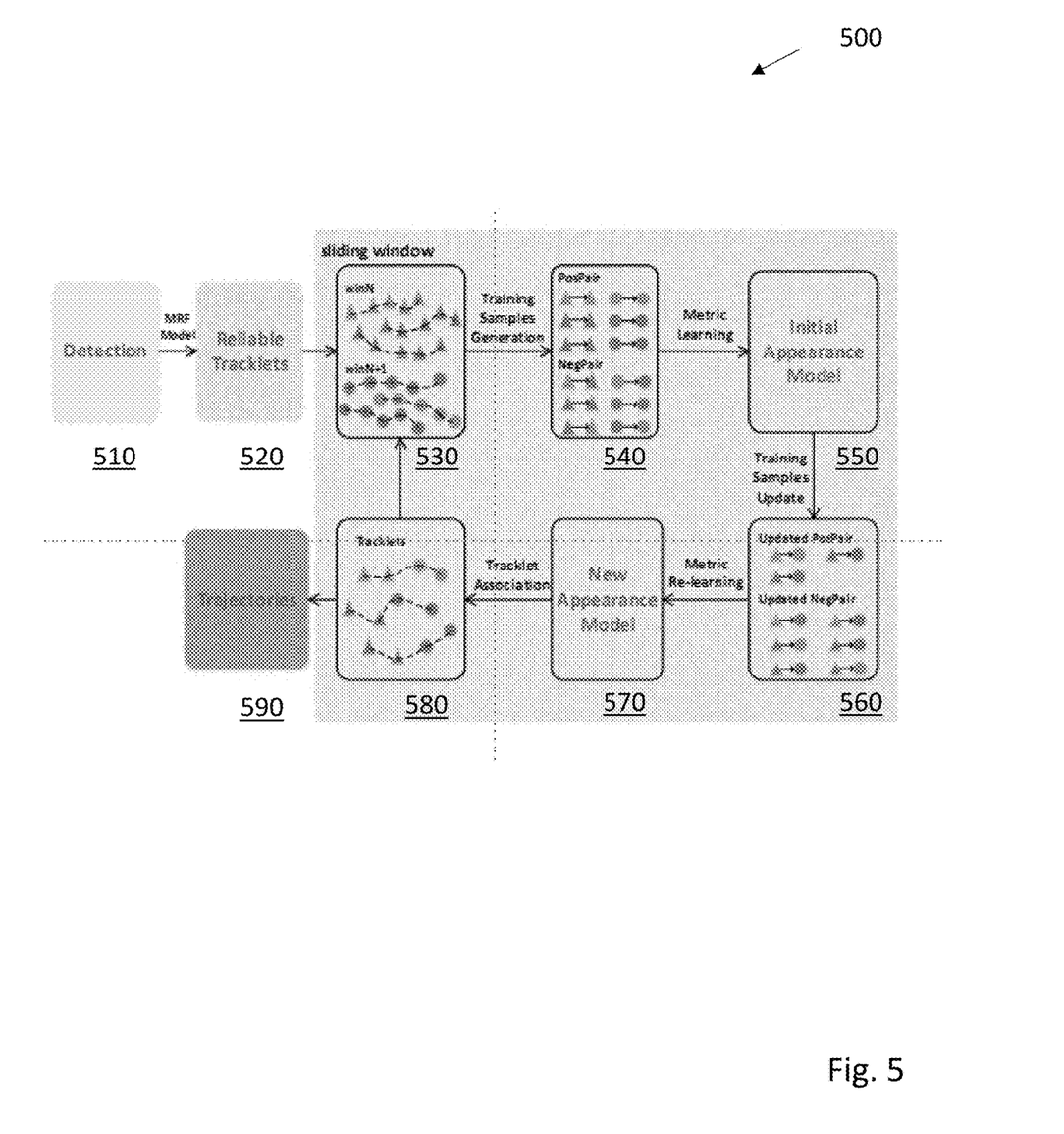
FIG. 5 illustrates a system that provides an online unified framework to determine local-to-global trajectory models using a regularized pairwise constrained component analysis (PCCA) algorithm.

This embodiment of a tracking system and method 500 is seen with respect to FIG. 5. Initial detection 510 based on a whole video segmented into non-overlapping short windows is followed by development of an Markov random field model and grouping in reliable tracklets 520. In sliding window module 530, initial training samples are only generated inside each individual sliding window, before correspondence between the triangle and the circle labeled tracklets is developed. For each sliding window, training samples are used to construct an initial metric with a regularized pairwise constrained component analysis (PCCA) algorithm, where spatial-temporal constraints are essential to guarantee the accuracy of positive/negative samples (module 540). Once this online metric learning is finished, short tracklets in adjacent windows can be associated to extend generate a training samples set designated at the initial appearance module 550. As tracklets are linked into longer trajectories, more samples could be collected to update training of more discriminative target appearances (module 560). Using the expanded training set, a new appearance model 570 can be further obtained, such that a more effective metric function can be re-learned in an iterative fashion. This new metric can be used to link all the target tracklets window by window (module 580) to form longer trajectories in trajectories module 590 and/or to pass selected information back to sliding window module 530.

In more detail, the previous system and method is based on a learning algorithm that associates tracklets. The algorithm can be divided into three major steps: sample collection, online metric learning and tracklet association/

Collecting initial training samples of tracklets sets in each generated non-overlapping temporal window, for the t-th window, specifically, can be understood by defining the tracklet set as $s_t^P$. Meanwhile $x \in R^d$ is the feature vector representing the appearance of detection responses in tracklets. Then, positive samples are generated from the same tracklet and negative samples from different tracklets, where the positive training set $S_t^P$ and the negative training set $S_t^N$ can be defined as:

$$S_t^P = \{R_k:(x_m^k,x_n^k)|x_m^k,x_n^k \in F_i\}$$

$$S_t^N = \{R_k:(x_m^k,x_n^k)|x_m^k \in F_i, x_n^k \in F_j, i \neq k\}$$

where $R_k$ is the k-th sample pair, and $F_i, F_j \in W_t$.

Only the first N frames of each tracklet is used to generate sample pairs to insure the accuracy of collected samples. For negative samples, some spatial-temporal constrains are adopted to guarantee that two tracklets belong to different targets. A limiting function is based on these constraints can be used:

$$C_{ij} = C_t(F_i,F_j)C_v(F_i,F_j)$$

The first constraint Ct is based on the observation that one object cannot belong to two tracklets. It is defined as $$C_t(F_i, F_j) = \begin{cases} 0, & \text{if } t_i^e > t_j^s \ \& \ t_j^e > t_i^s \\ 1, & \text{otherwise} \end{cases}$$

where $t_i^e$, $t_j^e$ are the end frames of tracklet $F_i$, $F_j$, and $t_i^s$, $t_j^s$ are the start frames of tracklet $F_i$, $F_j$. This function represents that if there is an overlap over time between two tracklets, they are treated as different persons.

The second constraint Cv is based on the fact that targets should not change their velocity abruptly, otherwise the tracklets cannot belong to the same person. For two non-overlapping tracklets, the function can be defined as $$C_v(F_i, F_j) = \begin{cases} 0, & \text{if } |P_i^s - (P_j^e + \overline{V}_j \cdot \Delta t)| > \sigma \\ 1, & \text{otherwise} \end{cases}$$

where $P_i^s$ is position of the start frame of $F_i$, $P_j^e$ is position of the end frame of $F_j$, $\overline{V}$ is average velocity of $F_j$, $\Delta t$ is the time gap between $F_i$ and $F_j$, and $\sigma$ is a threshold. This function represents that if there is a significant velocity difference between two tracklets, they are treated as different targets.

According to the limiting function, negative samples are collected from tracklet pairs whose $C_{ij}$ is equal to 0. Once the process of collecting training samples is finished, an online learning algorithm is used to build a discriminative appearance-based model.

The online learned appearance model can be based, for example, on an Online Algorithm for Scalable Image Similarity (OASIS), Probabilistic Relative Distance Comparison (PRDC), Information Theoretic Metric Learning (ITML), or Logistic Discriminant Metric Learning. In one embodiment, regularized pairwise constrained component analysis (PCCA) is used as a supervised on-line metric learning algorithm.

Using regularized PCCA, projected distances between samples from the same class should be smaller than a given threshold T while for the inter-class samples, the distances should be larger than T (to ensure the generality of algorithm, T is set to 1). With the obtained k-th sample pair $(x_m^k, x_n^k)$, a projected Mahalanobis-like distance $$D_M(x_m^k, x_n^k) = (x_m^k - x_n^k)^T M(x_m^k - x_n^k)$$

is used to measure the distances between identical or different person, where $M = P^T P$ and P is the projection matrix to learn, which maps data points into a low-dimensional space of dimension $d' \ll d$.

The overall objective function to learn the projection matrix is based on a generalized logistic loss function $$\ell_\beta(x) = \frac{1}{\beta}\log(1 + e^{\beta x}).$$

The objective function is defined as:

$$\min_P E(P) = \sum_{k=1}^{N'} \ell_\beta(y_k(D_P^2(x_m^k, x_n^k) - 1)) + \lambda \|P\|^2$$

where N' is the number of sample pairs; $y_k$ is a class label; for the positive samples, $y_k=1$ and otherwise, $y_k=-1$. The regularization parameter $\lambda$ is used to maximize the inter-class margin. Then, a d'×d matrix P can be found using a gradient descent-based method.

Next training samples and the appearance model are updated. Given two tracklets from adjacent sliding windows ($F_i \in W_t, F_j \in W_{t+1}$), the first N frames are extracted from both $F_i$ and $F_j$ as test samples, then the similarity of the appearance descriptors of ($F_i, F_j$) can be defined as:

$$S_a(F_i, F_j) = \left(\sum_{m=1}^{N}\sum_{n=1}^{N} D_P(x_m^i, x_n^j)/N^2\right)^{-1}$$

where $x_m^i$ is a feature vector of a detection response from Fi, and similarly $x_n^i$ is from $F_j$. This function uses the mean value of the relative distances between any two samples from $F_i$ and $F_j$ as the appearance similarity of the two tracklets.

Since the threshold is set so T=1, for positive samples, $S_a$ should be larger than 1 while for negative samples this value should be smaller than 1. To ensure the accuracy of training data, a strict restriction is adopted, i.e., $\alpha > 1, \beta < 1$ to represent the threshold of positive and negative samples. Then the regenerated samples are used to extend our training data and a more discriminative appearance-based model can be relearned.

Once an updated metric function is and a new tracklet set $W_t = \{F_i\}$ the tracklets to can be linked to form longer trajectories. To calculate the affinity score between $F_i$ and $F_j$, the objective function is defined as:

$$S_{ij}(F_i,F_j) = C_a(F_i,F_j)C_v(F_i,F_j)$$

where $C_a$, $C_v$ represent the similarity of appearance and velocity descriptors respectively.

Specifically, to calculate $C_a$, instead of taking only the first N frames as in the training process, to handle significantly environmental factors and people postures changes that would happen over the time, test samples can be randomly drawn from tracklets to calculate the appearance similarity. Therefore $C_a$ is defined by:

$$C_a(F_i, F_j) = \begin{cases} 1, & \text{if } S_a(F_i, F_j) > 1 \\ 0, & \text{otherwise} \end{cases}$$

The test pair $(F_i, F_j)$ can be regarded as a same person in the case of $S_{ij}=1$. The sliding window can move to the next and repeat the previous steps to generate longer trajectories window-by-window. Since there are still some gaps among adjacent tracklets in each trajectory possibility due to missed detections and occlusions, trajectory over the gaps based can be estimated according to a linear motion model.

In practice, implementations of the described algorithms provide for accurate tracking of multiple targets from a camera. Experimental results on two widely used public datasets: PETS09 and TUD-Stadmitte, are discussed as follow, with comparison to other state-of-the-art methods. The evaluation metrics used are listed below in Table I:

TABLE I

| Name | Definition |
|---|---|
| Recall | (Frame-based) correctly-matched objects/total ground truth objects. |
| Precision | (Frame-based) correctly-matched objects/total output objects. |
| FA/Frm | (Frame-based) No. of false alarms per frame. |
| GT | No. of groundtruth (GT) trajectories. |
| MT % | Mostly tracked: Percentage of GT trajectories which are covered by tracked output for more than 80% in length. |
| ML % | Mostly lost: Percentage of GT trajectories which are covered by tracked output for less than 20%. The smaller the better. |
| PT % | Partially tracked: 1.0-MT-ML. The smaller the better. |
| Frag | Fragments: The total of No. of times that a groundtruth is interrupted in tracking result. The smaller the better. |
| IDs | ID switches: The total of No. of times that a tracked trajectory changes its matched GT identity. The smaller the better. |
| MOTA | The Multiple Object Tracking Accuracy takes into account false positives, missed targets and identity switches. |
| MOTP | The Multiple Object Tracking Precision is simply the average distance between true and estimated targets. |

To fairly compare with existing works, original annotations of the datasets were used to ensure the consistency of offline learned human detector responses. An F1-measure was adopted to measure the two metrics comprehensively:

$$F_1 = 2 \cdot \frac{\text{precision} \cdot \text{recall}}{\text{precision} + \text{recall}}$$

which represents the harmonic mean of precision and recall.

Three videos (S2.L1,S2.L2,S2.L3) from PETS09 datasets contain different scenarios with a progressive increase in person density. The video length is 795, 436, 240 frames long respectively. The results are listed in Table II. Since tracklet generation is based on the described MRF model, it is used as a baseline and make a comparison. "Online" and "Offline" represents that the training samples for metric learning are respectively collected from all of the three videos in an online or offline fashion. A comparison with some other state-of-art methods is also included.

TABLE II

Comparison of Tracking Results with State-of-art Methods on the PETS09 Dataset.

| Method | Recall (%) | Precision (%) | $F_1$ (%) | FAF | GT | MT (%) | PT (%) | ML (%) | Frag | IDs | MOTA (%) | MOTP (%) |
|---|---|---|---|---|---|---|---|---|---|---|---|---|
| PETS-S2.L1 | | | | | | | | | | | | |
| B. Yang | 97.8 | 94.8 | 96.28 | 0.31 | 19 | 95 | 5 | 0 | 2 | 0 | — | — |
| S. Zhang | 97.0 | 98.6 | 97.79 | 0.08 | 19 | 95 | 5 | 0 | 4 | 0 | 95.6 | 91.6 |
| V. Chari | 92.4 | 94.3 | 93.3 | — | 19 | 95 | 5 | 0 | 74 | 56 | 85.5 | 76.2 |
| Offline | 95.3 | 96.4 | 95.8 | 0.13 | 19 | 95 | 5 | 0 | 2 | 3 | 94.2 | 91.3 |
| Online | 97.1 | 98.7 | 97.9 | 0.10 | 19 | 95 | 5 | 0 | 3 | 0 | 95.6 | 91.7 |
| PETS-S2.L2 | | | | | | | | | | | | |
| A. Milan | 65.5 | 89.8 | 75.8 | 1.43 | 74 | 37.8 | 45.9 | 16.3 | 99 | 73 | 56.9 | 59.4 |
| S. Zhang | 62.1 | 92.0 | 74.2 | 1.03 | 74 | 28.4 | 55.4 | 16.2 | 91 | 112 | 55.6 | 67.1 |
| V. Chari, | 60.6 | 88.6 | 72.0 | — | 43 | 14.0 | 79.1 | 6.9 | 379 | 244 | 50.4 | 60.6 |
| Offline | 64.9 | 91.0 | 75.7 | 1.05 | 74 | 32.4 | 55.4 | 12.2 | 102 | 94 | 56.9 | 66.9 |
| Online | 65.8 | 90.8 | 76.3 | 1.22 | 74 | 35.1 | 51.4 | 13.5 | 95 | 71 | 57.8 | 66.9 |
| PETS-S2.L3 | | | | | | | | | | | | |
| S. Zhang | 43.4 | 96.4 | 59.8 | 0.21 | 44 | 13.6 | 34.1 | 52.3 | 8 | 13 | 42.6 | 63.9 |
| V. Chari, | 45.4 | 91.2 | 60.7 | — | 44 | 27.3 | 34.1 | 38.6 | 50 | 44 | 40.3 | 61.2 |
| Offline | 40.1 | 96.7 | 56.7 | 0.25 | 44 | 18.2 | 33.4 | 48.4 | 13 | 21 | 41.7 | 62.5 |
| Online | 43.0 | 98.7 | 59.9 | 0.19 | 44 | 18.2 | 29.6 | 52.3 | 9 | 10 | 43.6 | 64.8 |

Experiments were also conducted using the TUD Stadtmitte dataset, which is 179 frames long. It was captured on a street with frequent occlusions and interactions among the pedestrians. Some of tracking results are shown in Table III below:

TABLE III

Comparison of Tracking Results between with State-of-art Methods on the TUD-Stadtmitte Dataset.

| Method | Recall (%) | Precision (%) | $F_1$ (%) | FAF | GT | MT (%) | PT (%) | ML (%) | Frag | IDs | MOTA (%) | MOTP (%) |
|---|---|---|---|---|---|---|---|---|---|---|---|---|
| B. Yang | 87.0 | 96.7 | 91.59 | 0.18 | 10 | 70 | 30 | 0 | 1 | 0 | — | — |
| S. Zhang | 85.8 | 98.1 | 91.54 | 0.10 | 10 | 80 | 20 | 0 | 2 | 1 | 84.2 | 86.5 |
| V. Chari | 59.6 | 89.9 | 72.0 | — | 10 | 20 | 80 | 0 | 22 | 15 | 51.6 | 61.6 |
| Ours (offline) | 84.2 | 98.4 | 90.7 | 0.17 | 10 | 70 | 30 | 0 | 3 | 5 | 81.9 | 85.9 |
| Ours (online) | 87.5 | 97.6 | 92.3 | 0.13 | 10 | 90 | 10 | 0 | 2 | 0 | 85.4 | 86.7 |

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A non-hierarchical and iteratively updated tracking system, comprising:
a processor; and
system memory coupled to the processor and storing instructions configured to cause the processor to:
derive trajectory models for multiple targets from a set of received image detections;
identify targets, from among the multiple targets, using a target model including solving a joint object function and maximal condition probability for the target model dependent on a hyper-parameter set, including:
formulate the hyper-parameter set from the trajectory models;
solve a unary term describing how a hidden state value fits an observation dependent on the hyper-parameter set;
solve a pairwise term defining a probability that adjacent nodes in a graph correspond to the same label depending on the hyper-parameter set; and
merge the solution of the unary term, the solution of the pairwise term, and a normalization factor into a solution of the joint object function and maximal conditional probability;
update the trajectory models, including linking tracklets to one another based on the solution of the joint object function and maximal conditional probability;
detect trajectory convergence for the multiple targets within the updated trajectory models based on equations associated with the linked tracklets satisfying a belief threshold; and
output the updated trajectory models.

2. The iteratively updated tracking system of claim 1, wherein instructions configured to derive trajectory models comprise instructions configured to access sliding windows initializable from at least one of a first frame and a previous sliding window.

3. The iteratively updated tracking system of claim 1, wherein instructions configured to identify targets using a target model comprise instructions configured to identify targets using a Markov random field model.

4. The iteratively updated tracking system of claim 1, wherein instructions configured to solve a joint object function and maximal condition probability comprise instructions configured to use a loopy belief propagation algorithm.

5. The iteratively updated tracking system of claim 1, further comprising instructions configured to reset the number of trajectory models.

6. The iteratively updated tracking system of claim 1, further comprising instructions configured to initialize the trajectory models.

7. An iteratively updated tracking system, comprising:
a processor; and
system memory coupled to the processor and storing instructions configured to cause the processor to
derive trajectory models for multiple targets from a set of received image detections;
identify targets, from among the multiple targets, using a Markov random field model including solving a joint object function and maximal condition probability of the Markov random field model using a loopy belief propagation algorithm depending on a hyper-parameter set, including:
formulate the hyper-parameter set from the trajectory models;
solve a unary term describing how a hidden state value fits an observation dependent on the hyper-parameter set;
solve a pairwise term defining a probability that adjacent nodes in a graph correspond to the same label depending on the hyper-parameter set; and
merge the solution of the unary term, the solution of the pairwise term, and a normalization factor into a solution of the joint object function and maximal conditional probability;
update the trajectory models, including linking tracklets to one another based on the solution of the joint object function and maximal condition probability;
detect trajectory convergence for the multiple targets within the updated trajectory models; and
output the updated trajectory models.

8. The iteratively updated tracking system of claim 7, wherein instructions configured to derive trajectory models comprise instructions configured to access sliding windows initializable from at least one of a first frame and a previous sliding window.

9. The iteratively updated tracking system of claim 7, wherein instructions configured to update the trajectory models comprising instructions configured to update the trajectory models based on model metric data.

10. The iteratively updated tracking system of claim 7, wherein instructions configured to detect trajectory convergence for the multiple targets within the updated trajectory models comprise instructions configured to detect trajectory convergence for the multiple targets within the updated trajectory models based on equations associated with the linked tracklets satisfying a belief threshold.

11. The iteratively updated tracking system of claim 7, further comprising instructions configured to reset the number of trajectory models.

12. The iteratively updated tracking system of claim 7, further comprising instructions configured to initialize the trajectory models.

13. The iteratively updated tracking system of claim 8, wherein instructions configured to identify targets comprises instructions configured to infer target identification for detections in a sliding window from among the sliding windows.

14. A non-hierarchical and iteratively updated tracking method, comprising:
   deriving trajectory models for multiple targets from a set of received image detections;
   identifying targets, from among the multiple targets using a target model including solving a joint object function and maximal condition probability for the target model dependent on a hyper-parameter set, including:
      formulating the hyper-parameter set from the trajectory models;
      solving a unary term describing how a hidden state value fits an observation dependent on the hyper-parameter set;
      solving a pairwise term defining a probability that adjacent nodes in a graph correspond to the same label depending on the hyper-parameter set; and
      merging the solution of the unary term, the solution of the pairwise term, and a normalization factor into a solution of the joint object function and maximal conditional probability;
   updating the trajectory models, including linking tracklets to one another based on the solution of the joint object function and maximal conditional probability;
   detecting trajectory convergence for the multiple targets within the updated trajectory models based on equations associated with the linked tracklets satisfying a belief threshold; and
   outputting the updated trajectory models.

15. The method of claim 14, wherein deriving trajectory models comprises accessing sliding windows initializable from at least one of a first frame and a previous sliding window.

16. The method of claim 14, wherein identifying targets using a target model comprise identifying targets using a Markov random field model.

17. The method of claim 14, wherein solving a joint object function and maximal condition probability comprises using a loopy belief propagation algorithm.

18. The method of claim 14, further comprising resetting the number of trajectory models.

19. The method of claim 14, further comprising initializing the trajectory models.

20. The method of claim 15, wherein identify targets comprises inferring target identification for detections in a sliding window from among the sliding windows.

* * * * *